(12) United States Patent
Woodward et al.

(10) Patent No.: US 8,576,387 B2
(45) Date of Patent: *Nov. 5, 2013

(54) FIBER IDENTIFICATION USING OPTICAL FREQUENCY-DOMAIN REFLECTOMETER

(75) Inventors: Sheryl Woodward, Holmdel, NJ (US); Jonathan Nagel, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 874 days.

This patent is subject to a terminal disclaimer.

(21) Appl. No.: 12/640,462

(22) Filed: Dec. 17, 2009

(65) Prior Publication Data

US 2011/0153543 A1 Jun. 23, 2011

(51) Int. Cl.
*G01N 21/00* (2006.01)

(52) U.S. Cl.
USPC .......................................... 356/73.1

(58) Field of Classification Search
USPC .......................................... 356/73.1
See application file for complete search history.

(56) References Cited

U.S. PATENT DOCUMENTS 6,687,426 B1 * 2/2004 May et al. ................ 385/15
2002/0145729 A1 * 10/2002 Reepschlager .............. 356/73.1
2005/0074244 A1 * 4/2005 Roberts et al. ............... 398/139

OTHER PUBLICATIONS

Hartog, et al., "On the Theory of Backscattering in Single-Mode Optical Fibers", Journal of LightWave Technology, vol. LT-2, No. 2, Apr. 1984, pp. 76-82.
Nakazawa et al., "Measurement and Analysis on Polarization Properties of Backward Rayleigh Scattering for Single-Mode Optical Fibers", IEEE Journal of Quantum Electronics. vol. QE-17, No. 12, Dec. 1981, pp. 2326-2334.
Gold et al., "Determination of Structural Parameter Variations in Single-Mode Optical Fibres by Time-Domain Reflectometry", Electronic Letters, Jun. 10, 1982, vol. 18, No. 12, pp. 489-490.
Luna Technologies, Luna OFDR Data Sheet, Optical Frequency Domain Reflectometer, pp. 1-12, Rev. Jul. 2004.

* cited by examiner

*Primary Examiner* — Tu Nguyen
(74) *Attorney, Agent, or Firm* — Fay Kaplun & Marcin, LLP

(57) ABSTRACT

Described herein are systems and methods for uniquely identifying, or "fingerprinting," optical fibers based upon hi-resolution measurements of the backscattered light. One embodiment of the disclosure of this application is related to a computer readable storage medium including a set of instructions that are executable by a processor. The set of instructions being operable to retrieve a profile for an intended fiber, the profile including unique measurement data of the intended fiber, receive from an optical frequency-domain reflectometer further measurement data from a connected fiber within a network, compare the unique measurement data of the intended fiber to the further measurement data of the connected fiber, and confirm an identity of the connected fiber as being the intended fiber when the unique measurement data matches the further measurement data, and trigger an alert when the unique measurement data does not match the further measurement data.

20 Claims, 3 Drawing Sheets

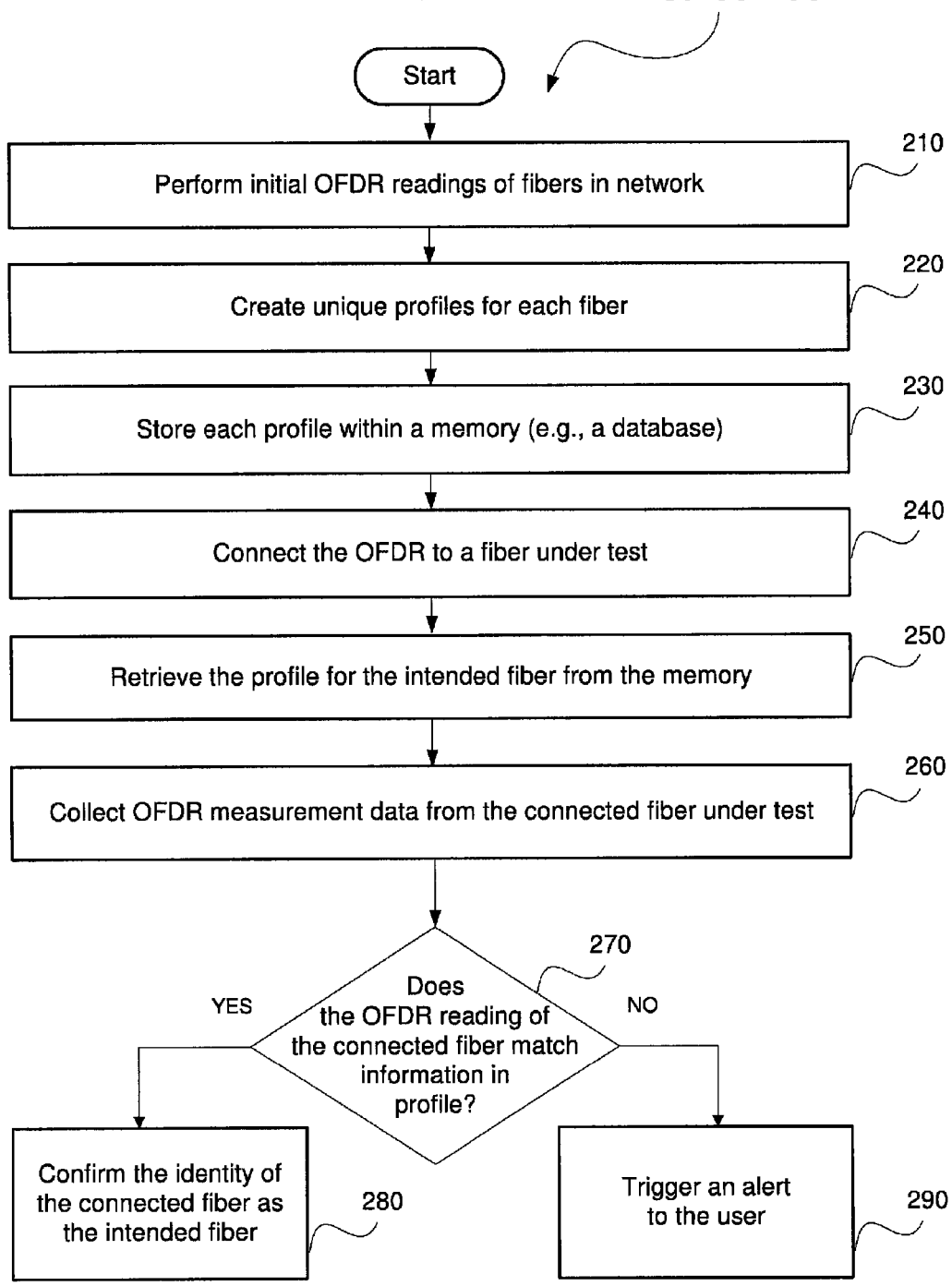

FIBER IDENTIFICATION USING OPTICAL FREQUENCY-DOMAIN REFLECTOMETER

BACKGROUND

An optical time-domain reflectometer ("OTDR") is an opto-electronic instrument used to characterize an optical fiber. A typical OTDR injects a series of optical pulses into the fiber during a testing process. From the same end of the fiber, the OTDR also extracts light that is scattered and reflected back from points in the fiber due to irregularities in the optical fiber structure. This process is equivalent to the manner in which an electronic time-domain reflectometer may measure reflections caused by changes in the impedance of the cable under test. Accordingly, the strength of the back-reflected light is measured and integrated as a function of time, and is plotted as a function of fiber length.

OTDRs have conventionally been standard equipment for the characterization of optical fiber. Specifically, it is well known that by transmitting a pulse down a fiber and analyzing the back-reflected light, the loss of the fiber may then be characterized. OTDRs may characterize the loss and length of an examined fiber during manufacture, during warehousing, during installation, and during splicing. OTDRs are also used in measuring optical return loss in the fiber, as well as locating faults in the fiber, such as breaks. Faults or failures in the fiber may be costly, in terms of repairing the fiber, as well as any adverse affects in service (e.g., disruption or loss of service). However, conventional identification and verification of specific fibers within a network are prone to human error.

Optical frequency domain reflectometers are designed to have better spatial resolution than a traditional OTDR, and thus can make hi-resolution measurements of the backscattered light of an optical fiber. However, OFDR's typically have a shorter measurement range. They were initially designed to characterize small optical devices, rather than long optical fibers used for transmission of signals. By employing interferometric technqiues, they are capable of a spatial resolution as small as 20 microns. However, their operating range is generally limited to making measurements over distances less than 100 m.

SUMMARY OF THE INVENTION

Described herein are systems and methods for uniquely identifying, or "fingerprinting," optical fibers based upon hi-resolution measurements of the backscattered light, such as can be performed by an optical frequency-domain reflectometer ("OFDR"). One embodiment of the disclosure of this application is related to a computer readable storage medium including a set of instructions that are executable by a processor. The set of instructions being operable to retrieve a profile for an intended fiber, the profile including unique measurement data of the intended fiber, receive from the OFDR further measurement data from a connected fiber within a network, compare the unique measurement data of the intended fiber to the further measurement data of the connected fiber, and confirm an identity of the connected fiber as being the intended fiber when the unique measurement data matches the further measurement data, and trigger an alert when the unique measurement data does not match the further measurement data.

A further embodiment of the disclosure of this application is related to a system comprising a memory storing profiles of a plurality of fibers within a network, each profile including unique measurement data pertaining to one of the plurality of fibers, an optical frequency-domain reflectometer ("OFDR") collecting further measurement data from a connected fiber, and a comparator comparing the further measurement data to the unique measurement data of the profiles, the comparator confirming an identity of the connected fiber as one of the plurality of fiber when the further measurement data match unique measurement data of one of the profiles, and the comparator triggering an alert when the further measurement data does not match unique measurement data of any of the profiles.

A further embodiment of the disclosure of this application is related to a method comprising retrieving a profile for an intended fiber, the profile including unique measurement data of the intended fiber, collecting, via an optical frequency-domain reflectometer ("OFDR"), further measurement data from a connected fiber within a network, comparing the unique measurement data of the intended fiber to the further measurement data of the connected fiber, and confirming an identity of the connected fiber as being the intended fiber when the unique measurement data matches the further measurement data, and trigger an alert when the unique measurement data does not match the further measurement data

BRIEF DESCRIPTION OF THE DRAWINGS

FIG. 2 shows an exemplary method for identifying an optical fiber using analysis techniques according to the embodiments described herein.

DETAILED DESCRIPTION

Figure 1A:
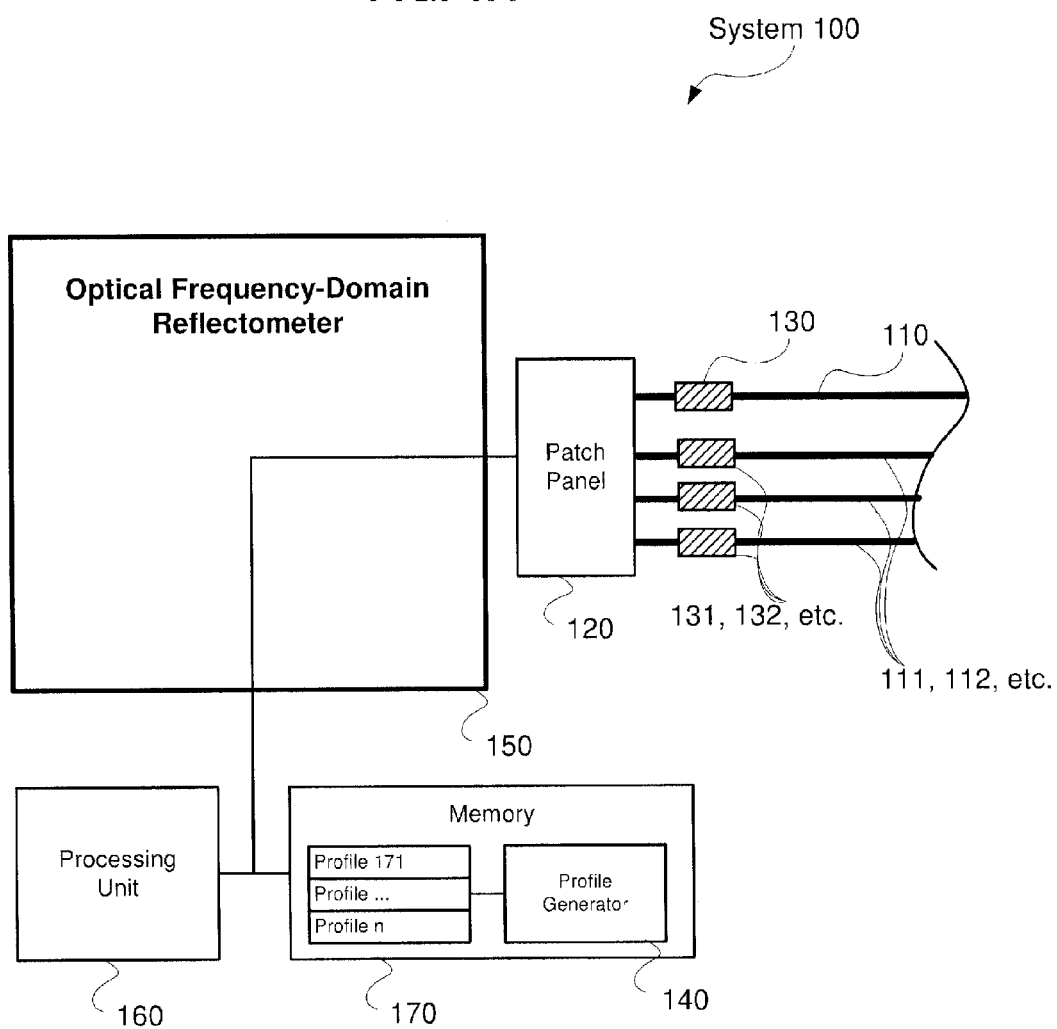
FIG. 1A shows an exemplary system for identifying an optical fiber using techniques according to the embodiments described herein.

The exemplary embodiments may be further understood with reference to the following description and the related appended drawings, wherein like elements are provided with the same reference numerals. The exemplary embodiments are related to systems and methods for uniquely identifying, or "fingerprinting," optical fibers based upon hi-resolution measurements of the backscattered light, such as can be performed by an optical frequency-domain reflectometer ("OFDR").

Similar to an optical time-domain reflectometer ("OTDR"), an exemplary OFDR may be used to measure and characterize fiber optic cables. However, unlike a conventional OTDR, the embodiments of the exemplary OFDR described herein may be more sensitive than the OTDR and may operate over a much shorter distance (e.g., over centimeters, as opposed to kilometers). Specifically, a probe signal from the OFDR may be a continuous frequency-modulated optical wave. In contrast to an OTDR system, the OFDR may use more energetic continuous wave probing to achieve high spatial resolution over shorter distances. As will be described in greater details below, the measurements from the exemplary OFDR may be used to uniquely identify specific optical fiber, as well as to subsequently verify the fibers.

Conventional identification of a particular fiber within a network office has been accomplished by tracing fiber jumpers. Furthermore, these conventional methods may typically require the use of these trace jumpers through a remote location, such as a remote central office. However these techniques have led to manual errors in fiber maintenance and network operations. In contrast to the conventional methods, the exemplary system and methods described herein utilize the sensitivity of the OFDR to obtain careful measurements of specific variations in the fiber. Specifically, the OFDR may measure a slight loss in backscattered light across a short section of fiber. It should be noted that loss measurements of backscattering may be used to detect fine variations in loss due due to imperfections in the optical fiber (e.g., within the glass). Since light propagating through a fiber optic cable will gradually attenuate, faults may be detected by monitoring portions of the backscattered light. These measured variations may then be used to verify the identity of a deployed fiber through making measurements along the length of the fiber. This may prove valuable in optical networking, especially if an OFDR can be integrated into transmission equipment.

Accordingly, the exemplary system and methods provide a more effective manner for allowing a user (e.g., field technician) to verify that the user is connected to an intended fiber when performing fiber characterizations, or connecting transmission equipment to the optical fiber. Specifically, if a technician inadvertently connects to any fiber other than the intended target fiber, the analysis of the data collected by the exemplary systems and methods may automatically identify, alert and report such an error. In other words, if a mistake is made during the testing of a particular fiber, such as the OFDR traces being measured on another fiber, then the analysis of backscattered loss measurements along a short distance may yield discrepancies. Accordingly, an alert may be produced to flag the fiber, or otherwise indicate that a mistake has been made.

FIG. 1A shows an exemplary system 100 for identifying an optical fiber 110 using techniques according to the embodiments described herein. The exemplary system 100 may include an OFDR 150 connected to a plurality of fibers, such as fibers 110, 111, 112, etc., for analytical testing and accurate identification. The fibers 110-112 may be connected to OFDR at a connection point, such as a patch panel 120 (or a fiber cross connect). It should be noted that short sections of fibers 110-112 may be measured near or at the location of the patch panel 120. Unlike an OTDR, the OFDR may be capable of very high-resolution measurements of the measured fibers 110-112 over these short sections (e.g., a scale on the order of centimeters or millimeters).

Figure 1B:
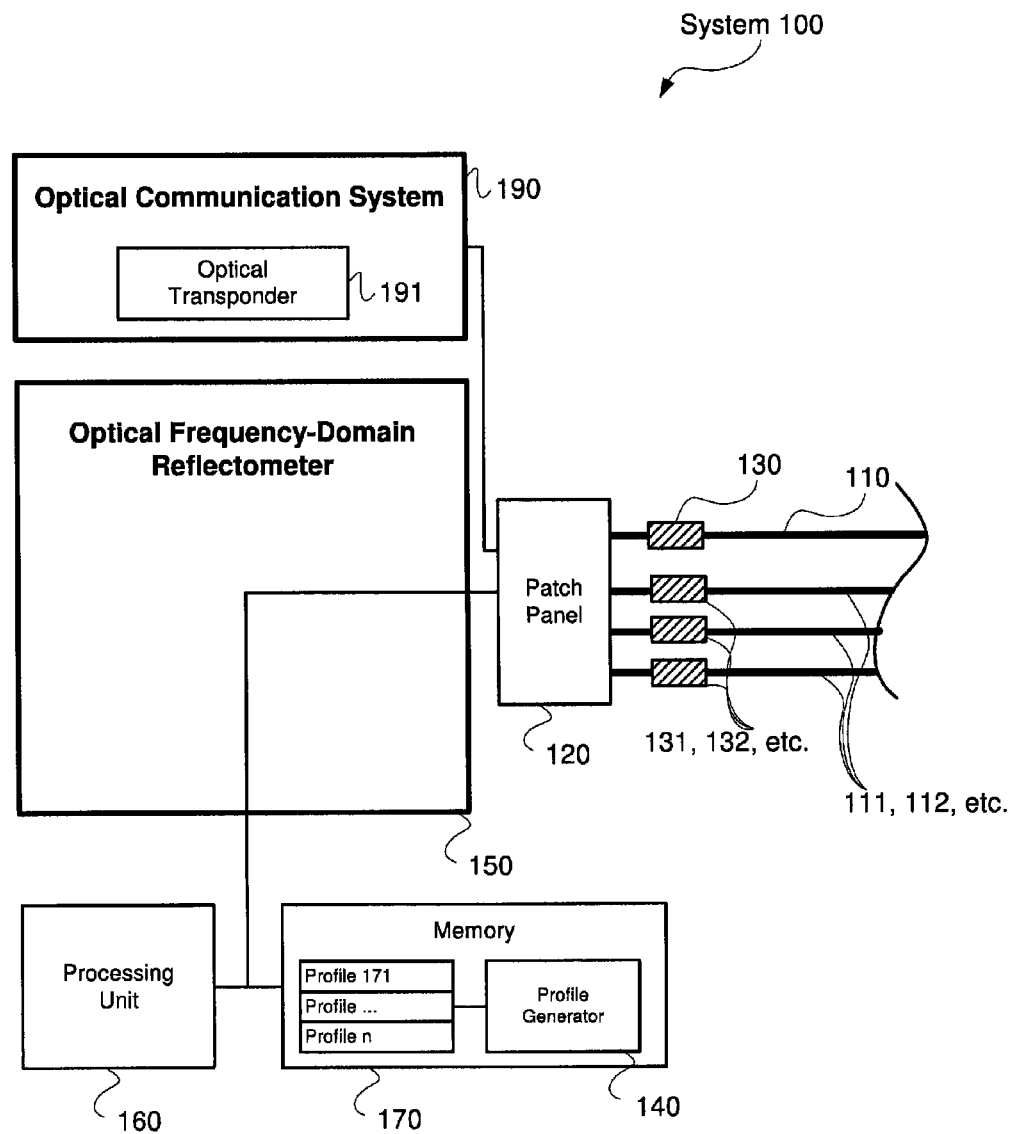
FIG. 1B shows an exemplary system for identifying an optical fiber using techniques according to the embodiments described herein.

Furthermore, the patch panel 120 may include a fiber-cross connect so that patch panel 120 may connect or disconnect OFDR 150 to any one of the fibers 110, 111, etc. Alternatively, as illustrated in the alternative embodiment of FIG. 1B, the patch panel 120 may also be connected to an optical communication system 190 which includes optical transponders 191.

Furthermore, the OFDR 150 may be in communication with a processing unit 160 (e.g., a processor, multiprocessor, CPU, a comparator, etc.) and a centralized data location, such as a memory 170 (e.g., a database). It should be noted that the processing unit 160 may perform a set of instructions related to the systems and methods described herein. Furthermore, the processing unit 160 may be in communication with a computer-readable storage medium, such as the memory 170, or any other form of computer memory. Accordingly, each of the OFDR 150, the processing unit 160, the memory 170 may be composed of various computer hardware or software components, or any combination thereof.

As will be described below, the processing unit 160 may identify the fiber 110 by comparing these high-resolution measurements from the OFDR 150 to information stored within the memory 170. It should be noted that each of the processing unit 160 and the memory 170 may reside within the OFDR 150, itself. Alternatively, these components may reside in separate devices in communication with the OFDR 150. Furthermore, it should be noted that the system 100 is not limited to a particular set of components, and may include any number of components, either more or less than those illustrated in FIG. 1A.

The exemplary OFDR 150 may be used for observing (e.g., through careful measurements) slight variations in backscatter loss in the short sections of a tested fiber 110 near the patch panel 120. Specifically, the OFDR 150 may include detectors for measuring and testing the fiber 110 using traces, or pulses, along a length of the fiber 110. From an OFDR trace, a user may see the level of backscattered, or back-reflected, light as a function of distance down the fiber 110. The signal level may be a function of fiber loss (e.g., attenuation) of the fiber 110.

It is important to note that the backscattered loss of this particular fiber 110 will vary from any other fibers (e.g., 111, 112, etc.) due to small variations during the manufacturing process. Furthermore, it should be noted that this observed loss for this particular fiber 110, or any other fiber, will not change with the age of the fiber, or with environmental changes around the fiber (e.g., temperature changes, humidity changes, etc.). In other words, the backscattered loss measured for the optical fiber 110 may be specific to only that one fiber 110 and may not change over the lifetime of the fiber 110.

According to the exemplary embodiments, the system 100 may provide a method for identifying, or fingerprinting, the optical fiber 110. As will be described in an exemplary method below, the OFDR 150 may perform measurement of the fiber 110 in order to identify the backscattered loss of the fiber 110. The centralized storage location, such as the memory 170 may collect this loss data for each fiber that is analyzed. For instance, a profile generator 140 may create unique entries or profiles in the memory 170 for each of the measured fibers (e.g., entry 171 may represent the backscattered loss readings for the tested fiber 110). Accordingly, each of the entries may include at least one identifier (e.g., name, location, ID number, etc.) for a specific fiber as well as its corresponding measurement data, such as the loss reading of the short sections of each of the fibers 110-112. The profile generator 140 may be composed of various computer hardware or software components, or any combination thereof. Furthermore, the profile generator 140 may reside within the memory 170, within the OFDR 150, and/or as a stand-alone component within the exemplary system 100.

As subsequent measurements are performed by the OFDR 150 on the additional fibers 111, 112, etc., the loss data of these subsequent measurements may be compared to the data within the memory 170. Specifically, the processing unit 160 may perform the comparisons and determine if the backscattered loss reading matches the intended unique entry within the memory 170. For example, if a technician planned on identifying the fiber 110, the technician may obtain a loss reading of the fiber 110 using the OFDR 150. This reading may then be compared to the entry 171 within the memory 170. The processing unit 160 may verify whether the current loss reading matches the information within the entry 171. If the reading does not match, the technician may then be informed that the fiber being examined by the OFDR 150 is not the intended fiber 110. If the reading does match, the technician may be assured that the OFDR 150 is connected the appropriate fiber 110.

According to an additional or alternative embodiment of the system 100, grating identifiers 130-132 may be placed at the ends of the fibers 110-112 upon obtaining measurements for each of the tested fibers 110-112. For instance, the grating identifiers 130-132 may be written or inscribed on a short portion of each of the fibers 110-112 by the fiber manufacturers. Accordingly, the grating identifiers 130-132 may create periodic variations in a reflective index. Similar to barcodes, the grating 130-132 may be designed to quickly and efficiently communicate one or more characteristics for each of the fibers 110-112.

The grating identifiers 130-132 may reflect a unique signal (e.g., a barcode) when characterized with an out-of-band OFDR trace. It should be noted that an out-of-band measurement technique may be employed to minimize any unwanted loss and reflections within the communication band used by the optical fiber under test (e.g., the C-band (1530 nm to 1565 nm) may typically be used for optical communication systems). Furthermore, the gratings 130-132 may be designed so that identifying signals are stronger. According to various embodiments of the system 100, these grating 130-132 may be used to identify an individual fiber, or a grouping of fibers that share one or more common characteristics. Therefore, these gratings 130-132 may be used in conjunction to, or as an alternative to, the fingerprinting profiles described above.

FIG. 2 shows an exemplary method 200 for identifying an optical fiber 110 using techniques according to the embodiments described herein. The method 200 will be described with reference to the system 100 and the components illustrated in FIG. 1A. Furthermore, the steps 210-230 of the method 200 are directed toward an initial set-up phase of the exemplary memory 170. The remaining steps 240-290 are directed towards the identification and verification of the tested optical fiber 110.

In step 210 of the method 200, the OFDR 150 may perform initial readings on any number of fibers within the optical fiber network. Specifically the OFDR 150 may perform traces from one end of the connected fiber to obtain fiber characteristics, such as the backscattered loss along a length of the connected fiber.

In step 220 of the method 200, the profile generator 140 may create unique profiles in the memory 170 for each of the fibers read in step 210. These unique profiles may include at least an identifier of the specific fiber, as well as a measurable characteristic of the fiber, such as the backscattered loss reading of each fiber. In other words, each of the profiles may act as a unique "fingerprint" for each of the measured fibers within the network.

In step 230 of the method 200, the processing unit 160 may store each of these profiles within the memory 170 in order to create a reference or legend for comparing future fiber readings to existing fiber profiles. Since the backscattered loss readings between any two fibers is distinct and since the loss readings for a particular fiber do not change over time, these unique profiles may provide a permanent identifier for each every fiber of the network.

Once the memory 170 has been created, the method 200 may advance to the remaining steps 240-290. However, it should be noted that the memory 170 may be continuously updated as new fibers are added to the optical fiber network and as fibers are removed from the network. Thus, these initial steps 210-230 may be performed at any time.

In step 240 of the method 200, the OFDR 150 may be connected to the one of the fibers. For instance, a user may wish to perform analytical testing on a specific fiber 110. However, due to the number of fibers throughout the network, the user may be unsure of which of the fibers is the intended fiber 110. In other words, the user wants to confirm that the connected fiber is, in fact, the intended fiber 110.

In step 250 of the method 200, the processing unit 160 may retrieve the profile 171 of the intended fiber 110 from the memory 170. As noted above, this profile 171 may be referenced by a unique identifier, such as a name, location, ID/product number, of the intended fiber 110. This profile 171 may also include measurable characteristics of the intended fiber 110, such as the loss reading.

In step 260 of the method 200, the OFDR 150 may collect measurement data from the connected fiber. Similar to the initial step 210, this measurement data may include loss readings from the connected fiber. Accordingly, the OFDR 150 calculates the backscattered loss along a short length (e.g., from the OFDR 150 to the patch panel 120) of the connected fiber by performing OFDR traces from one end of the fiber.

In step 270 of the method 200, the processing unit 160 may compare the loss reading from the profile 171 of step 250 to the OFDR 150 measurement of step 260. This comparison will allow the processing unit 160 to determine whether these loss readings match. If the loss reading of the connected fiber matches the loss of the profile 171 for the intended fiber 110, the method 200 may advance to step 280. If the loss reading of the connected fiber does not match the loss of the profile 171 for the intended fiber 110, the method 200 may advance to step 290.

In step 280 of the method 200, the processing unit 160 may confirm the identity of the connected fiber as being the intended fiber 110. Accordingly, the user may be assured that he is connected to the appropriate fiber and may perform any further characterizations and operations needed on this intended fiber 110.

In step 290 of the method 200, the processing unit 160 may trigger an alert to the user that the connected fiber is not the intended fiber 110. This alert may be transmitted to the user via a visual and/or audio cue. Furthermore, this alert may be transmitted to the user via a display on the OFDR 150. Accordingly, the user may be quickly informed of this connection mistake and may correct this mistake with appropriate actions (e.g., review the layout of the fiber network, connect to another fiber, obtain a reading on this other fiber, etc.).

According to an alternative method, the user may simply use the OFDR 150 to quickly identify a plurality of fibers within the optical fiber network. As opposed to verifying whether a single connected fiber is the intended fiber 110, the user may wish to efficiently identify several fibers. Once the memory 170 has been created, the user may perform several OFDR traces on a group to obtain backscattered loss readings for each of the fibers. As the data is collected individually for each fiber, these loss readings may be compared to the profiles within the memory 170. Each profile match may allow the user to accurate identify a particular fiber within the group. Therefore, this alternative method may allow the user manage the plurality of fibers, such as physically labeling and inventorying each of the identified fibers for future reference.

The exemplary systems and methods described above may aid in inventory control, as it would allow for users to track and correlate all data on numerous fibers in a network during the lifespan of each fiber (e.g., from the initial fiber implementation into the network to the removal of the fiber from the network. Having an inventory system capable of tracking these changes over time would be beneficial to a network operator, and accordingly, this may aid in network operations.

The OTDR 150 may be used to verify that the equipment (e.g., the patch panel 120) is connected to the proper fibers. This may be valuable to verify that optical communication systems are connected to the correct fibers in dynamic optical networks, wherein the optical communication systems may be switched to different fibers as network demands change, or in response to equipment outages.

It will be apparent to those skilled in the art that various modifications may be made in the described embodiments, without departing from the spirit or the scope of the application. Thus, it is intended that the present disclosure covers modifications and variations of this application provided they come within the scope of the appended claims and their equivalents.

What is claimed is:

1. A non-transitory computer readable storage medium including a set of instructions that are executable by a processor, the set of instructions, when executed by the processor, causing the processor to perform operations comprising:
retrieving a profile for an intended fiber, the profile including unique measurement data of the intended fiber;
receiving from a fiber-optic measurement device capable of hi-resolution measurements further measurement data from a connected fiber within a network;
comparing the unique measurement data of the intended fiber to the further measurement data of the connected fiber; and
confirming an identity of the connected fiber as being the intended fiber when the unique measurement data matches the further measurement data, and trigger an alert when the unique measurement data does not match the further measurement data.

2. The non-transitory computer readable storage medium according to claim 1, wherein the fiber-optic measurement device is an optical frequency-domain reflectometer.

3. The non-transitory computer readable storage medium according to claim 1, wherein the operations further comprise:
receiving initial measurements of a plurality of fibers in the network, the plurality of fibers including the intended fiber;
creating a plurality of profiles for each of the plurality of fibers, each of the profiles including unique measurement data for each of the fibers; and
storing the plurality of profiles.

4. The non-transitory computer readable storage medium according to claim 1, wherein the unique measurement data includes a first variation in backscatter loss of the intended fiber and the further measurement includes a second variation in backscatter loss of the connected fiber.

5. The non-transitory computer readable storage medium according to claim 1, wherein the measurement data includes a grating identifier identifying a characteristic of the connected fiber.

6. The non-transitory computer readable storage medium according to claim 1, wherein the alert is one of an audible tone, a visual indication, and a notification to a user.

7. A system, comprising:
a memory storing profiles of a plurality of fibers within a network, each profile including unique measurement data pertaining to one of the plurality of fibers;
a fiber-optic measurement device capable of hi-resolution measurements collecting further measurement data from a connected fiber; and
a comparator comparing the further measurement data to the unique measurement data of the profiles, the comparator confirming an identity of the connected fiber as one of the plurality of fiber when the further measurement data match unique measurement data of one of the profiles, and the comparator triggering an alert when the further measurement data does not match unique measurement data of any of the profiles.

8. The system according to claim 7, wherein the fiber-optic measurement device capable of hi-resolution measurements is an optical frequency-domain reflectometer.

9. The system according to claim 7, further comprising:
a profile generator for receiving initial measurements of a plurality of fibers in the network, the plurality of fibers including the intended fiber, creating a plurality of profiles for each of the plurality of fibers, each of the profiles including unique measurement data for each of the fibers, and storing the plurality of profiles in the memory.

10. The system according to claim 7, wherein the unique measurement data includes a first variation in backscatter loss of the intended fiber and the further measurement includes a second variation in backscatter loss of the connected fiber.

11. The system according to claim 7, wherein the measurement data includes a grating identifier identifying a characteristic of the connected fiber.

12. The system according to claim 7, wherein the optical frequency-domain reflectometer includes one of a detector, a processing unit, and a memory.

13. The system according to claim 7, wherein the comparator is a processing unit.

14. The system according to claim 7, wherein the alert is one of an audible tone, a visual indication, and a notification to a user.

15. A method, comprising:
retrieving a profile for an intended fiber, the profile including unique measurement data of the intended fiber;
collecting, via wherein the fiber-optic measurement device capable of hi-resolution measurements further measurement data from a connected fiber within a network;
comparing the unique measurement data of the intended fiber to the further measurement data of the connected fiber; and
confirming an identity of the connected fiber as being the intended fiber when the unique measurement data matches the further measurement data, and trigger an alert when the unique measurement data does not match the further measurement data.

16. The method according to claim 15, wherein the fiber-optic measurement device capable of hi-resolution measurements is an optical frequency-domain reflectometer.

17. The method according to claim 15, further comprising:
performing initial measurements of a plurality of fibers in the network, the plurality of fibers including the intended fiber;
creating a plurality of profiles for each of the plurality of fibers, each of the profiles including unique measurement data for each of the fibers; and
storing the plurality of profiles.

18. The method according to claim 15, wherein the unique measurement data includes a first variation in backscatter loss of the intended fiber and the further measurement includes a second variation in backscatter loss of the connected fiber.

19. The method according to claim 15, wherein the measurement data includes a grating identifier identifying a characteristic of the connected fiber.

20. The method according to claim 15, wherein the alert is one of an audible tone, a visual indication, and a notification to a user.

* * * * *